Patented May 19, 1931

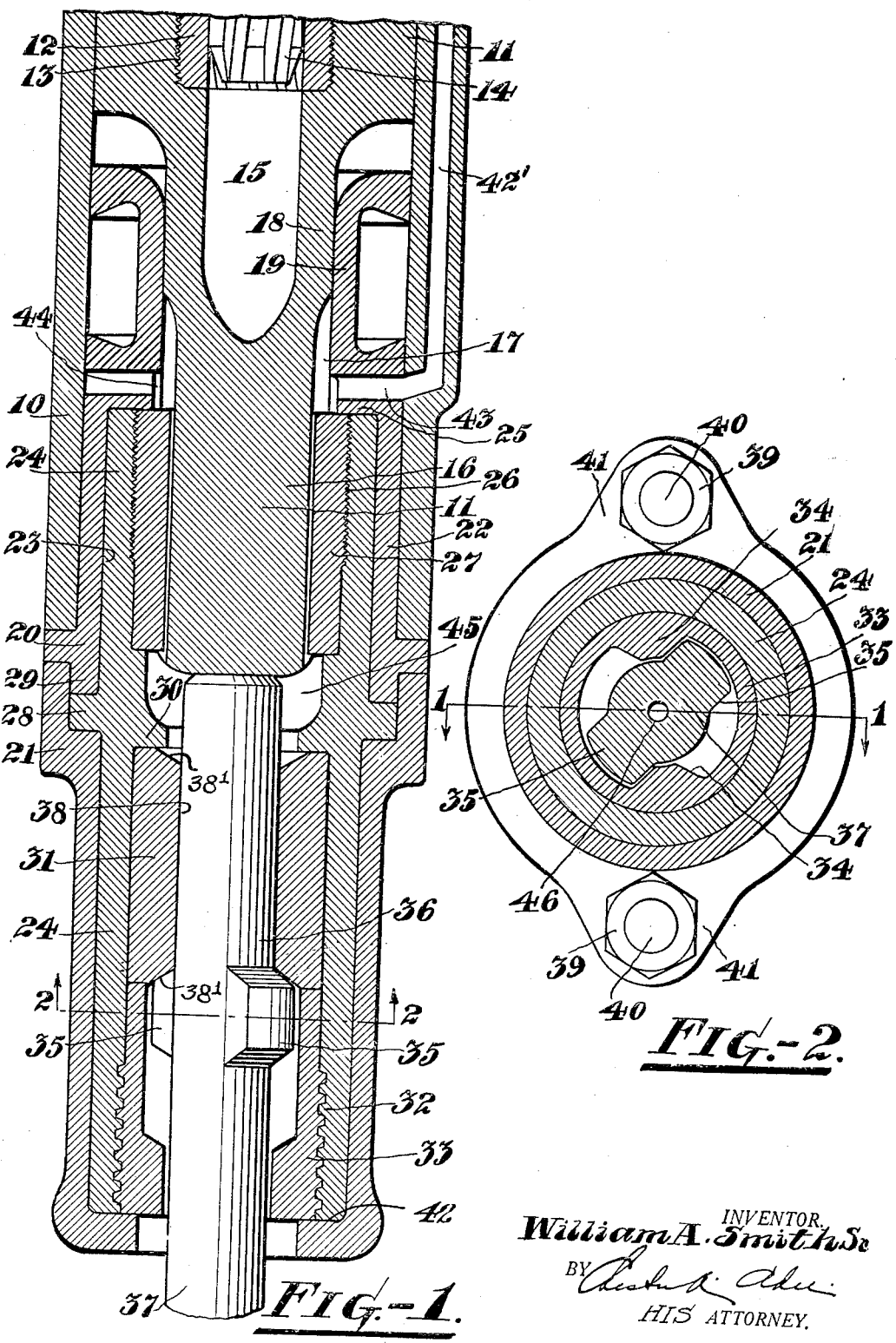

1,806,315

UNITED STATES PATENT OFFICE

WILLIAM A. SMITH, SR., OF EASTON, PENNSYLVANIA, ASSIGNOR TO INGERSOLL-RAND COMPANY, OF JERSEY CITY, NEW JERSEY, A CORPORATION OF NEW JERSEY

CHUCK FOR ROCK DRILLS

Application filed October 25, 1928. Serial No. 315,020.

This invention relates to rock drills, but more particularly to a chuck for rock drills.

It is an object of this invention to devise a chuck for rock drills which will facilitate the assembly thereof.

Another object is to provide a chuck mechanism in which the parts most subject to wear may be quickly and cheaply replaced.

A still further object is to increase the strength of the rock drill without a corresponding increase in weight and thereby to reduce breakage of parts.

Other objects will be in part obvious and in part pointed out hereinafter and the nature of the invention may be more fully understood by reference to the drawings in which, Figure 1 is a longitudinal section of the front end of a rock drill and Figure 2 is a transverse section of Figure 1 taken on the line 2—2 looking in the direction indicated by the arrows.

Referring more particularly to the drawings 10 indicates the front part of the cylinder of a rock drill. A hammer piston 11 is reciprocably mounted therein. In the rearward end of the piston 11 a rifle nut 12 is secured by means of threads 13. A rifle bar 14, cooperating with the rifle nut 12, operates through a rotation mechanism (not shown) to cause the piston 11 to make a partial rotation about its axis with each stroke. During the rearward stroke of the piston the rifle bar enters a hollow 15 formed in the piston. The striking end of the piston is in the form of a reduced extension 16 having flutes 17 formed thereon. A cylindrical portion 18 of the extension 16 fits slidably in the bore of an oiler 19. A front cylinder washer 20 is interposed between the cylinder 10 and a front head 21 which is secured to the cylinder by means of the usual side bolts 40 passing through lugs 41. An extension 22 on the cylinder washer 20 permits the cylinder washer to enter the cylinder for a substantial distance and the cylindrical interior surface 23 of the extension 22 provides a bearing surface for a chuck 24. At its rearward end the chuck 24 abuts an interior flange 25 on the front cylinder washer extension 22. The rearward interior surface of the chuck 24 is threaded as at 26 for the reception of an exteriorly threaded chuck nut 27. The interior surface of the chuck nut 27 is provided with a fluted portion which is adapted to cooperate with the fluted extension 16 of the piston 11.

Intermediate the ends of the chuck an exterior flange 28 abuts a short forward extension 29 on the front cylinder washer 20, and an interior flange 30 provides an abutment for a chuck bushing 31 which is fitted within the chuck 24. The chuck bushing 31 is preferably of plain cylindrical form and a close sliding fit in the chuck 24. A longitudinal bore 38, preferably provided with a countersunk portion 38' at each end, extends through the chuck bushing 31 and is adapted to receive the shank 36 of a working implement 37 with the usual lugs 35 thereon abutting the countersunk portion at one end of the bore 38. When the countersunk portion 38' at one end of the bushing becomes worn or damaged from contact with the lugs 35, the bushing may be readily reversed in the chuck 24 to bring the countersunk portion 38' at the other end of the bushing 31 into engagement with the lugs 35. The extreme forward end of the chuck is interiorly threaded at 32 for the reception of a correspondingly threaded chuck jaw 33. Inwardly extending raised portions 34 in the chuck jaw engage the lugs 35 on the shank 36 of the working implement 37.

In assembling the chuck mechanism the chuck nut 27 is screwed into place in the chuck 24, the chuck bushing 31, which has the longitudinal bore 38 adapted to receive the shank 36 of the working implement 37, is then inserted into the forward end of the chuck and the chuck jaw 33 screwed into place. The front cylinder washer 20 is then inserted into the cylinder 10. The rearward end of the chuck is then inserted in the front cylinder washer bore 23. The front head 21 is placed over the forward end of the chuck and the nuts 39 tightened on the side bolts 40. The chuck 24 extends to the extreme forward end of the front head and said chuck as well as the chuck jaw 33 seat against an introverted flange 42 at the front end of the front head 21.

After the working implement 37 is inserted and the operation of the tool started the chuck and chuck mechanism operate as follows:

The rifle bar 14 is limited to rotation in one direction by a pawl and ratchet (not shown), consequently the spiral flutes on the rifle bar cause the piston 11 to rotate on its upward or downward stroke as the case may be. However, the flutes 17 on the piston extension 16 are engaged in the chuck nut 27, hence the chuck 24 must rotate with the piston and the rotation of the chuck will be transmitted to the working implement through the medium of the chuck jaw 33 and the lugs 35, thus imparting the desired rotation to the working implement.

Air for cleansing the drilled hole enters a passage 42' from a source of supply (not shown). From the passage 42' it enters a chamber 44 surrounding the fluted portion of the piston, by way of a passage 43. The air, being under pressure, passes down the flutes 17 into a chamber 45 and from this chamber to the drilled hole by way of a passage 46 in the drill steel.

By the construction described above an exceptionally strong, simple and cheap chuck mechanism is produced. The washer 20 which takes most of the wear is easily and cheaply replaced when necessary, and the long single piece chuck 24 strengthens the joint between the front head and the cylinder and adds rigidity to the tool and thus among others the objects hereinbefore mentioned are accomplished.

I claim:

1. In combination with a rock drill cylinder and a front head having a bore therein and an introverted flange at its front end, of a hollow chuck in the bore extending beyond the rear end of the front head into the cylinder and seating with its front end against the flange; an internal flange in the chuck, a chuck bushing in the chuck and seating against the internal flange, and a chuck jaw threaded into the front end of the chuck and bearing against the chuck bushing to clamp said chuck bushing fixedly in the chuck.

2. In combination with a rock drill cylinder and a front head having a bore therein and an introverted flange at its front end, of a hollow chuck in the bore extending beyond the rear end of the front head into the cylinder and seating with its front end against the flange, an internal flange on the chuck, a reversible chuck bushing slidably fitted in the chuck with its rear end seating against the internal flange, and a chuck jaw threaded into the front end of the chuck and bearing against the front end of the chuck bushing to clamp said chuck bushing fixedly in the chuck.

In testimony whereof I have signed this specification.

WILLIAM A. SMITH, Sr.